United States Patent Office 2,962,419
Patented Nov. 29, 1960

2,962,419
DIETETIC COMPOSITIONS

Arthur Minich, Westfield, N.J., assignor to Heyden Newport Chemical Corporation, New York, N.Y., a corporation of Delaware No Drawing. Filed May 20, 1957, Ser. No. 660,097

13 Claims. (Cl. 167—81)

The present invention is concerned with the novel dietetic use of certain fat substitutes and relates to the dietetic feeding of individuals, either singly or in groups, to control their obesity or to control the amount of lipids, including cholesterol, present in the blood stream, or both.

It is desirable for many reasons to control at times the amount of fat consumed by an individual. Fat may be either a solid or liquid oil essentially consisting of the glycerol esters of the higher fatty acids with glyceryl tripalmitate, glyceryl tristearate and glyceryl trioleate being the most prevalent esters. Fat breaks down in the digestive tract and the ingestion of fat tends to increase the weight of the individual. It is quite important in the control of an individual's weight to control the amount of fat consumed, thereby effecting either a reduction in weight or preventing an undesirable increase in weight. In addition, it is quite important for some individuals that the amount of lipids present in the blood stream be maintained at a minimum. This is particularly the case for people afflicted with some types of heart trouble where the presence of a relatively large amount of cholesterol in the blood serum is considered dangerous by some authorities. Cholesterol is one of the lipids, and the eating of fat is one means of increasing the amount of lipids, including cholesterol, in the blood. It is customary to place such an individual on a relatively fat-free diet. The term "fat-free" is applied to diets containing less fat than normal, although some fat is usually present in a fat-free diet.

Maintaining a person on a fat-free diet presents a number of problems. Fat is used extensively in the preparation of many foods. For example, fat is used as a parting agent in frying or baking, and as shortening to enhance the flavor or character of foods. Butter is used at least in part to flavor foods, while liquid oils are used in the preparation of salad dressings to impart the desired quality and flavor to the food. Not only is a person who is on a fat-free diet greatly limited as to the foods which may be consumed, but he must follow an abnormal diet which does not have the flavor or the physical characteristics to which he is accustomed. These factors make it very difficult psychologically for a person to follow a diet of reduced fat content.

I have discovered that certain non-fat esters may be used dietetically to control an individual's weight or to control the lipid content of the blood stream. These esters are not toxic and are not digested like normal fats. The present esters do not break down in the stomach or upper intestinal tract and may be used to control the intake of fat and thereby the individual's weight, the amount of lipids in the blood stream, or both. These fat substitutes may be used in the same manner as fat and may be used as solid or liquids in place of solid or liquid fat. They can be used as a food ingredient such as shortening or as an oil in salad dressing and may be used as a parting agent or cooking medium in frying or baking. These esters may be added with or without mixing to a food to impart thereto the desired characteristics normally obtained with fat. For example, the esters may be added to cooked vegetables as a replacement for butter. An important advantage of the esters of the present invention resides in the fact that they are palatable and do not have the undesirable, lasting oily feel of mineral oil. Accordingly, the dietetic use of these esters will not meet with the resistance encountered in the past when attempts were made to feed individuals food materially different from that to which they were accustomed. The present esters fill a serious need for a fat substitute that will meet both the dietetic and psychological requirements.

The esters of the present invention are used in the feeding of individuals, either human or animal, and form a part of the over-all diet for the individual. Accordingly, these esters are dietetic materials and are useful in dietetic compositions. However, these dietetic esters need not be incorporated in food, but may form part of the over-all diet administered orally to the individual. The term "dietetic" is not limited to the esters being mixed with foods. The esters may be administered as such, or with flavoring, vitamins or other edible material, particularly for reducing the lipid content of the blood stream.

The dietetic esters of the present invention are esters of certain alcohols esterified in part or in the entirety with a fatty acid or a mixture of fatty acids with the fatty acid containing at least 4 carbon atoms. The alcohols contain from 1–8 hydroxyl radicals and include at least one neopentyl nucleus. The neopentyl nucleus comprises four methylene groups all joined to a single carbon atom. This neopentyl nucleus has the following structure:

(1) 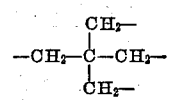

Illustrative alcohols containing a single neopentyl nucleus are pentaerythritol, trimethylolethane, trimethylolpropane, trimethylolbutane, and neopentyl alcohol which is 2,2-dimethyl, 1-propanol. This group of alcohols contains from 1–4 hydroxyl radicals, and in the ester from one to all of the hydroxyl radicals are replaced with the acid radical of the esterifying fatty acid. In addition to forming the esters from such alcohols, the partial ethers of these polyhydric alcohols may be esterified. These partial ethers of polyhydric alcohols are polyhydric alcohols in which part, but not all of the hydroxyl radicals are etherified; that is, replaced by the radical, O-alkyl. Such an ether is also an alcohol as it will contain at least one hydroxyl (OH) radical. Thus, any one of the three following partial alkyl ethers of pentaerythritol may be esterified to replace all or part of the hydroxyl radicals with an acid radical:

(2) 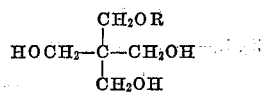

(3)
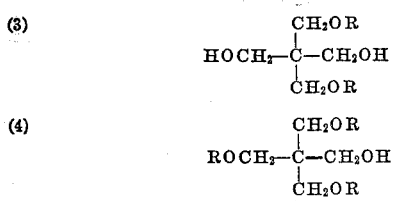

(4)

wherein R represents an alkyl radical. This alkyl radical is the radical of the alcohol used for etherification. While the lower aliphatic alcohols are more readily available, "alkyl" is not limited to alkyl radical containing 1–5 carbon atoms and alkyl radicals of any length may be present. For example, the alkyl radical may contain 12 or more carbon atoms and may contain a straight or a branched chain.

The alcohols containing a single neopentyl nucleus which can be esterified are those having the following structural formula, it being understood that the alcohol contains at least one and up to four replaceable hydroxyl radicals:

(5)
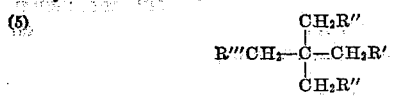

wherein R' is OH or O-alkyl, R" is H, OH, or O-alkyl; and R'" is H, OH, O-alkyl or an alkyl radical containing 1–4 carbon atoms.

In the term, "O-alkyl," the term "alkyl" designates an alkyl radical and has the value indicated above when discussing what R represents.

The esters of the alcohols containing the single neopentyl nucleus are esters of an alcohol containing from one to four hydroxyl radicals and having from one to all of the hydroxyl radicals replaced by an acid radical. Thus, the ester contains at least one and may contain up to four acid radicals. These esters have the following structural formula:

(6)
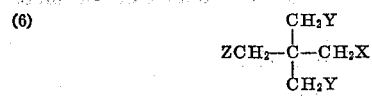

wherein X represents OH, O-alkyl, or an acid radical of a fatty acid containing at least four carbon atoms; Y represents H, OH, O-alkyl, or an acid radical of a fatty acid containing at least four carbon atoms; Z represents H, OH, O-alkyl, an alkyl radical containing 1–4 carbon atoms, or an acid radical of a fatty acid containing at least four carbon atoms.

In Formula 6, X, Y and Z together represent 1–4 acid radicals.

The dietetic esters may be partially or fully esterified alcohols containing two neopentyl nuclei. Alcohols of this type are ethers or dimers of the aforementioned polyhydric alcohols containing a single neopentyl nucleus; for example, dipentaerythritol, di-trimethylolethane, and the like. Partial ethers of these alcohols may be used with the partial ethers, of course, containing at least one replaceable hydroxyl radical. These alcohols have the following structural formula, it being understood that the alcohol contains at least one and up to six replaceable hydroxyl radicals:

(7)
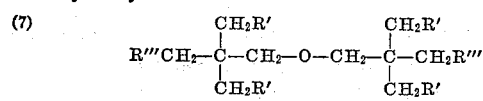

wherein R' and R'" have the same value, as in Formula 5. The esters of these alcohols have the following structural formula, it being understood that the formula includes at least one and up to six esterifying acid radicals:

(8)
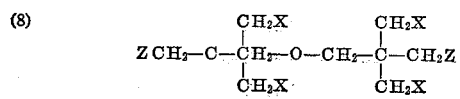

wherein X and Z each have the value previously indicated in connection with Formula 6.

Tripentaerythritol or any one of its partial ethers may be esterified with a fatty acid containing at least 4 carbon atoms to form the dietetic esters. The ester will, of course, contain at least one acid radical and may contain as many as 8 esterifying acid radicals. This group of esters has the following structural formula:

(9)
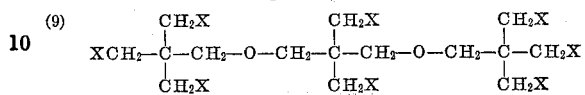

wherein X has the value previously indicated in connection with Formula 6.

Esterification of the previously mentioned alcohols is known, and the present esters may be formed by esterifying the alcohol which may or may not contain ether groups with one or a mixture of fatty acids to produce the corresponding esters. The ester may be a mixture of esters in which portions of the alcohol are esterified in varying amounts. Thus, a mixture of the mono-, di-, tri-, and tetra esters of pentaerythritol may be used. The esterifying acid may be any one or a mixture of fatty acids containing at least 4 carbon atoms. The fatty acid may contain a straight or branched chain. For example, any one, or a mixture of any of the following fatty acids may be used: butyric acid, caproic acid, caprylic acid, pelargonic acid, capric acid, lauric acid, myristic acid, palmitic acid, margaric acid, stearic acid, 2-ethyl hexoic acid, ricinoleic acid, oleic acid, linoleic acid, linolenic acid, linseed oil acids, arachidic acid, heneicosanic acid, behenic acid, lignoceric acid, cerotic acid, melissic acid and psyllastearic acid.

The present esters are non-toxic, are free of undesirable taste and odor, in most instances being entirely free of taste, are palatable, are physiologically and psychologically effective and they may be used with fat to replace only part of the fat instead of being used to replace all of the fat normally in the diet. The present esters may be combined with flavoring or seasoning, either natural or artificial, or may be administered in the pure form as a sterile pharmaceutical preparation or with a pharmaceutical carrier.

The ester or esters used or preferred in any particular instance is influenced by a number of factors, including the physical characteristics of the fat substitute. For example, where a liquid fat is normally used, then an ester which is liquid at room temperature may be preferred. Where a solid is normally used, then an ester which is solid at room temperature may be preferred. Of course, in many instances either a solid or liquid fat may be used, and, thus, a solid or liquid ester may be used. For example, the esters formed by completely esterifying pentaerythritol may be liquid or solid. In general, for esters of pentaerythritol, as the carbon chain, not including the carbon atom of the carboxyl group, increase up to six carbon atoms, the minimal melting point is reached and the esters are oils. As the carbon chain increases materially above this point, the esters become solids.

*Example I*

The present esters are not attacked, hydrolyzed, by the enzyme pancreatic lipase, and, therefore, cannot be assimilated. Glycerol esters are hydrolyzed by this enzyme, and, accordingly, are assimilated. Illustrative of this, pentaerythritol tetracaprylate and a glycerol ester fat were separately mixed with pancreatic lipase in vials. Upon standing, the glycerol ester hydrolyzed to glycerol and fatty acid while the pentaerythritol ester did not change.

*Example II*

A basic dietetic mixture for rats was prepared by mixing casein and sugar, supplemented with vitamins and minerals. For comparative feeding, some of this dietetic mixture was mixed with 11% corn oil to form a fat-containing control food. A fat-free, dietetic food was made up of this dietetic mixture mixed with 1% corn oil and 10% pentaerythritol tetracaprylate. The percentages were by weight and were based on the quantity of dietetic mixture. Each food mixture, in the form of a moist white powder, was fed separately to separate groups of four rats. Demand feeding was used; that is, a supply of this food was kept before the rats in the cage at all times and the rats were free to eat all of this food they desired.

After being fed these diets for seven weeks, both groups of rats were sacrificed. The blood of each group of four rats was pooled and the serum separated. A total lipid analysis was made on the serum from each group of rats and the lipid balance was as follows:

|  | Mg. |
|---|---|
| Rats on Control Diet | 6,384 |
| Rats on Fat-Free Diet | 4,677 |
| Difference | 1,707 |

In the above, the number of milligrams are the number of milligrams of potassium dichromate oxidized per 100 cc. of blood serum. If the number of mg. is divided by 17.5, the result is the milligrams of total lipids per 100 cc. of blood serum. Thus, the blood serum of the rats on the fat-free diet contained 264 mg. of total lipids per 100 cc. The expected variation between individual rats on the same diet is ±5.65 mg. of total lipids per 100 cc. of blood serum. Each of the rats on the fat-free diet had, on the average, 24 mg. less total lipids per 100 cc. of the blood serum than rats on the control diet.

The total serum lipids include two categories. The first category is the triglycerides while the second category includes cholesterol and the phospho lipids. The lipids in the second category do not vary independently of each other. In the present instance, there were strong indications that the proportion of the two categories of lipids in the serum from the rats on the fat-free diet was the same as in the serum from rats on the control diet so that the cholesterol content of the bloodstream was reduced by the use of the fat-free diet containing the pentaerythritol ester.

Demand feeding was used and the rats on the fat-free diet consumed more than the rats on the normal diet so that their growth pattern was the same over the period involved. Both groups of rats were in the same healthy condition at the end of the feeding program. If the rats on the fat-free diet had been limited to the same amount of food, their weight would have been less. However, despite the consumption of a larger quantity of food, the rats on the fat-free diet had less lipids in their blood serum.

*Example III*

Pancakes were prepared from a dry pancake mix, the recipe for which called for the addition of about a tablespoon of shortening per cup of the dry mix prior to, or along with the addition of the liquid when preparing a pancake batter. A pancake batter was prepared in accordance with the recipe, except that pentaerythritol tetracaprylate was used in place of the customary shortening. The pancakes were cooked on a griddle on which there had been applied pentaerythritol tetracaprylate as a parting agent.

The pancakes were eaten, and their flavor and texture were the same as those of pancakes prepared in a similar manner using ordinary shortening.

*Example IV*

Eggs were fried in pentaerythritol tetracaprylate and in pentaerythritol tetrastearate. The fried eggs were quite palatable, and there was none of the undesirable oily taste normally associated with mineral oil and the like.

*Example V*

The present esters may be used in place of the shortening normally used in baking pastries and the like. For example, a pie-crust recipe may call for combining a half cup of liquid vegetable shortening and five tablespoons of ice-water with two cups of flour containing one teaspoon of salt to form a dough which can be rolled into a pie-crust. A similar pie-crust dough can be prepared by substituting a half cup of pentaerythritol tetracaprylate for the half cup of liquid vegetable oil.

Other liquid esters of the present invention may be used in the above recipe. The solid esters, as well as the liquid esters, of the present invention may be similarly used in recipes normally calling for the use of lard or other shortening.

The foregoing examples are illustrative, it being understood that the present esters may be used in any food as a fat substitute and may be administered with food to reduce the fat intake or administered orally in the pure form to reduce the lipid content of the bloodstream. Regardless of the form used, the oral administration of the present esters constitutes the dietetic use of the esters, as they form part of the overall diet of the individual.

I claim:

1. A dietetic food composition comprising a substantially fat-free food and an ester which is liquid at ambient temperatures, said ester being the product of the esterification of a polyhydric alcohol selected from the group consisting of neopentyl glycol, trimethylolethane, trimethylolpropane, pentaerythritol, and dipentaerythritol with an amount of fatty acid containing at least 4 carbon atoms which will esterify substantially all of the hydroxy groups of said polyhydric alcohol.

2. The dietetic food composition of claim 1 wherein the fatty acid used in the preparation of the ester is caproic acid.

3. The dietetic food composition of claim 1 wherein the fatty acid used in the preparation of the ester is caprylic acid.

4. A dietetic composition comprising a vitamin and an ester which is liquid at ambient temperatures, said ester being the product of the esterification of a polyhydric alcohol selected from the group consisting of neopentyl glycol, trimethylolethane, trimethylolpropane, pentaerythritol, and dipentaerythritol with an amount of fatty acid containing at least 4 carbon atoms which will esterify substantially all of the hydroxyl groups of said polyhydric alcohol.

5. A dietetic composition comprising a flavoring material and an ester which is liquid at ambient temperatures, said ester being the product of the esterification of a polyhydric alcohol selected from the group consisting of neopentyl glycol, trimethylolethane, trimethylolpropane, pentaerythritol, and dipentaerythritol with an amount of fatty acid containing at least 4 carbon atoms which will esterify substantially all of the hydroxyl groups of said polyhydric alcohol.

6. A dietetic food composition comprising a substantially fat-free food and pentaerythritol tetracaproate.

7. A dietetic food composition comprising a substantially fat-free food and trimethylolethane tricaproate.

8. A dietetic food composition comprising a substantially fat-free food and trimethylolethane tricaprylate.

9. A dietetic food composition comprising a substantially fat-free food and trimethylolpropane tricaprylate.

10. A dietetic food composition comprising a substantially fat-free food and an ester which is liquid at ambient temperatures, said ester being the product of the esterification of pentaerythritol and fatty acid containing at least 4 carbon atoms in the amount of approximately 4 moles of said fatty acid per mole of pentaerythritol.

11. A dietetic food composition comprising a substantially fat-free food and an ester which is liquid at ambient temperatures, said ester being the product of the esterification of trimethylolethane and fatty acid containing at least 4 carbon atoms in the amount of approximately 3 moles of said fatty acid per mole of trimethylolethane.

12. A dietetic food composition comprising a substantially fat-free food and an ester which is liquid at ambient temperatures, said ester being the product of the esterification of trimethylolpropane and fatty acid containing at least 4 carbon atoms in the amount of approximately 3 moles of said fatty acid per mole of trimethylolpropane.

13. A dietetic food composition comprising a substantially fat-free food and pentaerythritol tetracaprylate.

References Cited in the file of this patent

UNITED STATES PATENTS

| | | |
|---|---|---|
| 2,223,558 | Epstein | Dec. 3, 1940 |
| 2,229,222 | Reid | Jan. 1, 1941 |
| 2,236,517 | Cahn et al. | Apr. 1, 1941 |
| 2,356,745 | Barth et al. | Aug. 29, 1944 |
| 2,611,708 | Owens | Sept. 23, 1952 |
| 2,688,551 | Graham | Sept. 7, 1954 |

FOREIGN PATENTS

| | | |
|---|---|---|
| 648,782 | Great Britain | Jan. 10, 1951 |